United States Patent [19]
Peterson

[11] 4,058,758
[45] Nov. 15, 1977

[54] COOPERATIVE PRIMARY AND SECONDARY CURRENT LIMITING TO SELECTIVELY LIMIT AGGREGATE AND INDIVIDUAL CURRENT OUTPUTS OF A MULTI OUTPUT CONVERTER

[75] Inventor: William Anders Peterson, Lake Parsippany, N.J.

[73] Assignee: Bell Telephone Laboratories, Incorporated, Murray Hill, N.J.

[21] Appl. No.: 702,039

[22] Filed: July 2, 1976

[51] Int. Cl.² .............................................. H02M 7/00
[52] U.S. Cl. ........................................ 363/80; 363/21; 363/25; 363/56
[58] Field of Search ................... 321/2, 18, 19, 11, 14

[56] References Cited
U.S. PATENT DOCUMENTS

| | | | |
|---|---|---|---|
| 3,701,937 | 10/1972 | Combs | 321/14 X |
| 3,736,491 | 5/1973 | Kuster | 321/14 |
| 3,742,371 | 6/1973 | Seibt et al. | 321/18 X |
| 3,859,586 | 1/1975 | Wadlington | 321/18 |

Primary Examiner—William M. Shoop
Attorney, Agent, or Firm—Alfred G. Steinmetz

[57] ABSTRACT

A single-ended converter circuit operating in a transformer coupled mode is disclosed having multiple outputs. A current limiting circuit is included on the primary side of the power transformer to limit the total aggregate current output of the converter. Secondary current limiting circuitry is included in selected ones of the multiple outputs to individually limit current outputs of the converter. A similar current limiting arrangement is disclosed for application to double-ended type converter circuits.

16 Claims, 3 Drawing Figures

COOPERATIVE PRIMARY AND SECONDARY CURRENT LIMITING TO SELECTIVELY LIMIT AGGREGATE AND INDIVIDUAL CURRENT OUTPUTS OF A MULTI OUTPUT CONVERTER

BACKGROUND OF THE INVENTION

1. Field of the Invention

This invention is concerned with the overcurrent protection of converter circuits and, in particular, in limiting the output current in a selected output of a multiple output converter circuit. In particular, it is concerned with combining an action of a primary current limiting circuit which limits the total aggregate output current of the converter with a secondary current limit circuit to independently limit the current output at selected outputs.

2. Prior Art

A common current limiting arrangement in DC-to-DC converters is located on the primary side of the power transformer and operates by sensing the peak current flowing through the primary winding of the power transformer. This design is widely used and has the advantage of having low cost and being relatively high in efficiency.

A primary current limit control arrangement such as described above is disclosed in U.S. Pat. No. 3,859,586 issued to J. C. Wadlington on Jan. 7, 1975, and assigned to the same assignee as this application. In the primary current limit circuit disclosed therein the current in the primary winding of the power transformer is sensed and the duty cycle of the converter switching devices is controlled to limit the maximum current. In one particular arrangement shown a primary current limit circuit is disclosed to accommodate a converter having multiple outputs. In a multiple output converter utilizing primary current limiting control, a single output current may be at a very high level above its allowable current limit while the primary current being sensed is still within limits. This limitation of primary current limiting in the Wadlington patent is overcome by utilizing foldback techniques in current limit control. In the current limit circuit disclosed therein a foldback response of the current limit circuit to a detected overcurrent reduces the total current output to less than the maximum current allowed for any one output. This arrangement, while a definite improvement, still permits the existence of an overcurrent at one output without automatically activating the overcurrent limit circuit.

An alternate approach to current limiting individual outputs of a multiple output converter is to use independent current limit circuits in each current output. However, this generally requires a separate power source or a tertiary winding on the transformer to supply power to operate the current limiting circuitry. The former arrangement is costly and the latter arrangement is not compatible with a converter having primary current limiting circuitry. This incompatibility arises because the voltage of the tertiary winding will track the output voltage to an unusable level during current limiting, hence, during current limiting the current limiting circuit itself is liable to become inoperative.

SUMMARY OF THE INVENTION

It is therefore an object of this invention to limit selected outputs of a multiple output converter.

It is another object to limit selected outputs of a multiple output converter without the need for an independent secondary power source or tertiary winding on the transformer.

It is yet another object of the invention to limit selected outputs of a multiple output converter with a minimum of component parts and a very small power dissipation therein.

Therefore, in accordance with a disclosed embodiment of the invention, a converter circuit incorporating primary current limiting includes a secondary current limit circuit which does not require a separate bias supply. This secondary current limit circuit is self-biasing and self-powered. It derives its power by utilizing flyback voltages and a voltage responsive to the overcurrent itself. This secondary current limiting circuit operates in a fashion so as to be either independent or supplementary to the primary current limit circuit and, indeed, may be added to a primary current limit circuit as a supplemental feature.

In the embodiments disclosed, a converter having multiple outputs and a primary current limiting circuit includes a secondary current limiting circuit in at least one of the multiple outputs. This secondary current limiting circuit is embodied in apparatus which operates through the energization of the current path by a flyback voltage of the secondary winding whose current output is being limited. Current flow in the current path is enabled by a transistor which is biased into conduction by the voltage across a current sensing resistor connected in the flyback current path. When the transistor is biased conducting, the current flow through the transistor of the current path activates a light emitting diode whose light signal in turn activates a phototransistor located on the primary side of the converter. The phototransistor is connected to the primary current limiting circuit so that its output is supplemental to the output of the basic primary current limit control circuit. This connection is such that the phototransistor output signals may operate to limit current independent of the action of the basic primary current limit circuit. This output signal operates to limit the duty cycle of the converter switching device so as to limit the particular detected overcurrent.

In one particular embodiment disclosed a single-ended DC-to-DC converter operating in a transformer coupled mode includes several independent secondary windings. At least one output winding is disclosed as coupled to a half-wave rectifier with an output filter and a flyback current path. The converter circuit has a primary overcurrent limit protection circuit on the primary side of the transformer. Current flow in the switching device is monitored by a current sensing circuit and when the peak current exceeds a certain threshold a signal is generated which is utilized to reduce the duty cycle of the switching device and hence reduce the output current.

One of the multiple outputs includes a current sensing device in the flyback path of the output filter. In general, if only one of the multiple outputs is monitored, the lowest powered output contains the current sensing arrangement since the primary current limit circuit controls the higher powered output. The current sensing device comprises a resistor connected in the flyback path of the output filter. At a certain current threshold the voltage drop across this resistor biases a transistor conducting. This transistor has its main conduction path included in a current path arranged to be energized by the flyback voltage in the secondary winding. When the transistor is biased conducting during the flyback current period, current flows due to the flyback voltage of the secondary winding. The current path includes an LED (light emitting diode) which, when current energized, operates a phototransistor on the primary side of the converter. The signal output of the phototransistor is combined with the output of the primary current limiting circuit. Hence, if the current in the secondary output being monitored exceeds a certain threshold, the duty cycle is reduced to limit that particular output. This output is limited even if the total aggregate current output of the converter is within safe limits and the primary current limit sensing circuit is not activated.

A second arrangement for this overcurrent protection circuitry is disclosed as being adapted for a double-ended converter having multiple outputs. In this arrangement the primary current limiting circuit responds to current sensing in the common return path of the inverter section of the converter. In the secondary current limit circuit a current sensing resistor is connected in series with one of the output rectifying diodes in the selected multiple output being monitored. As in the single-ended version, the voltage drop across this current sensing resistor biases a transistor conducting to enable a current path energized by a flyback voltage of the secondary winding. A light emitting diode included in this current path activates a phototransistor located on the primary side of the converter to limit the duty cycle of the switching device and hence limit the output current of the particular output selectively monitored.

An advantageous feature of the invention is that it may be utilized to regulate output currents in the absence of a primary current limit circuit or may be utilized in conjunction with a primary current limit circuit where each operates independently of the other.

DETAILED DESCRIPTION

Figure 1:
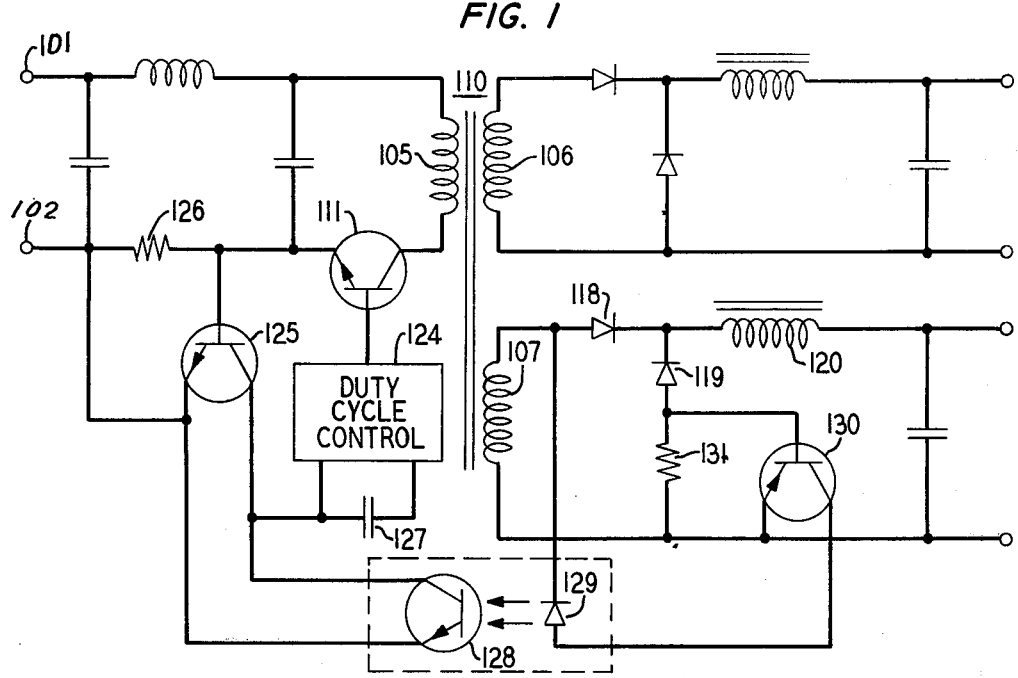
FIG. 1 discloses a single-ended converter having multiple outputs and employing secondary current limiting in accordance with the principles of the invention.

The single-ended converter shown in FIG. 1 operates in a transformer coupled mode wherein the rectifier output of the secondary winding conducts during the same time interval that the primary switching device is conducting. This converter is shown as having two outputs, a primary current limiting circuit, and a secondary current limiting circuit to control the output of one of the multiple outputs. A DC voltage is applied to the two input terminals 101 and 102. The transistor switch 111 is controlled by the duty cycle control 124 to periodically conduct. Transistor 111 conducts periodically and a periodic voltage signal is applied to the primary winding 105 of the power transformer 110. The periodic signal applied to the primary winding 105 induces a periodic pulse signal in the two output windings 106 and 107.

The converter circuit includes a primary current limiting control. This primary current limit circuit operates in response to the peak current detected in the current sensing resistor 126. The base emitter junction of transistor 125 is connected across the current sensing resistor 126. The collector of the transistor 125 is coupled to capacitor 127 which in turn is coupled to the duty cycle control 124. The duty cycle control 124 is a periodic circuit which periodically generates pulses with a controlled pulse width to drive the switching transistor into saturation. The pulse width is controlled in response to selected inputs to the duty cycle control. These inputs are generated by regulation and protection circuitry. For simplicity, only the overcurrent limit inputs are disclosed herein.

The duty cycle control responds to a collector output of the transistor 125 to reduce the duty cycle of the switching transistor 111. The transistor 125 senses the peak value of the current flowing through the sensing resistor 126. The peak signal at the collector of transistor 125 is converted into a DC signal by the capacitor 127. This DC signal is applied to the duty cycle control 124 and operates to terminate conduction in switching transistor 111 and thereby limit the duty cycle in order to limit the current flowing through the primary winding 105.

The converter circuit includes two secondary transformer windings 106 and 107. The output current of winding 107 is monitored by a secondary current limit circuit. It is assumed in this illustration that the output power of the winding 107 is less than the output power of the winding 106 for reasons discussed hereinabove. The output current on winding 107 is current limited by sensing the peak value of the flyback current flowing through the current sensing resistor 131. It operates as follows. When the switching transistor 111 is biased nonconducting, the rectifying diode 118 is backbiased. In response to the stored energy in the filter inductor 120, a flyback current essentially equal to the DC load current flows through the current sensing resistor 131 and the flyback diode 119. The reverse voltage of the winding 107 is applied across the collector-emitter path of the transistor 130. If the current flow through the current sensing resistor 131 generates a voltage drop which exceeds the base emitter turn on voltage of transistor 130, a current flow is enabled through the collector-emitter path of the transistor 130 in response to the reverse voltage across the winding 107. This current flows through the light emitting diode 129. The current flow in the light emitting diode 129 generates a light signal which activates the photo-coupled phototransistor 128. The activated phototransistor 128 applies a signal to the duty cycle control 124 to limit the duty cycle of the switching transistor 111.

This secondary current limiting circuit, as is apparent from the description, operates consistently irrespective of the average voltage across the winding 107. The reverse voltage across winding 107 is always present to supply a current to activate the light emitting diode 129. The phototransistor 128 has its collector-emitter path shunted across the collector-emitter path of the current limit transistor 125 and hence either the primary or secondary current limiting may operate independently or in conjunction with each other.

Figure 2:
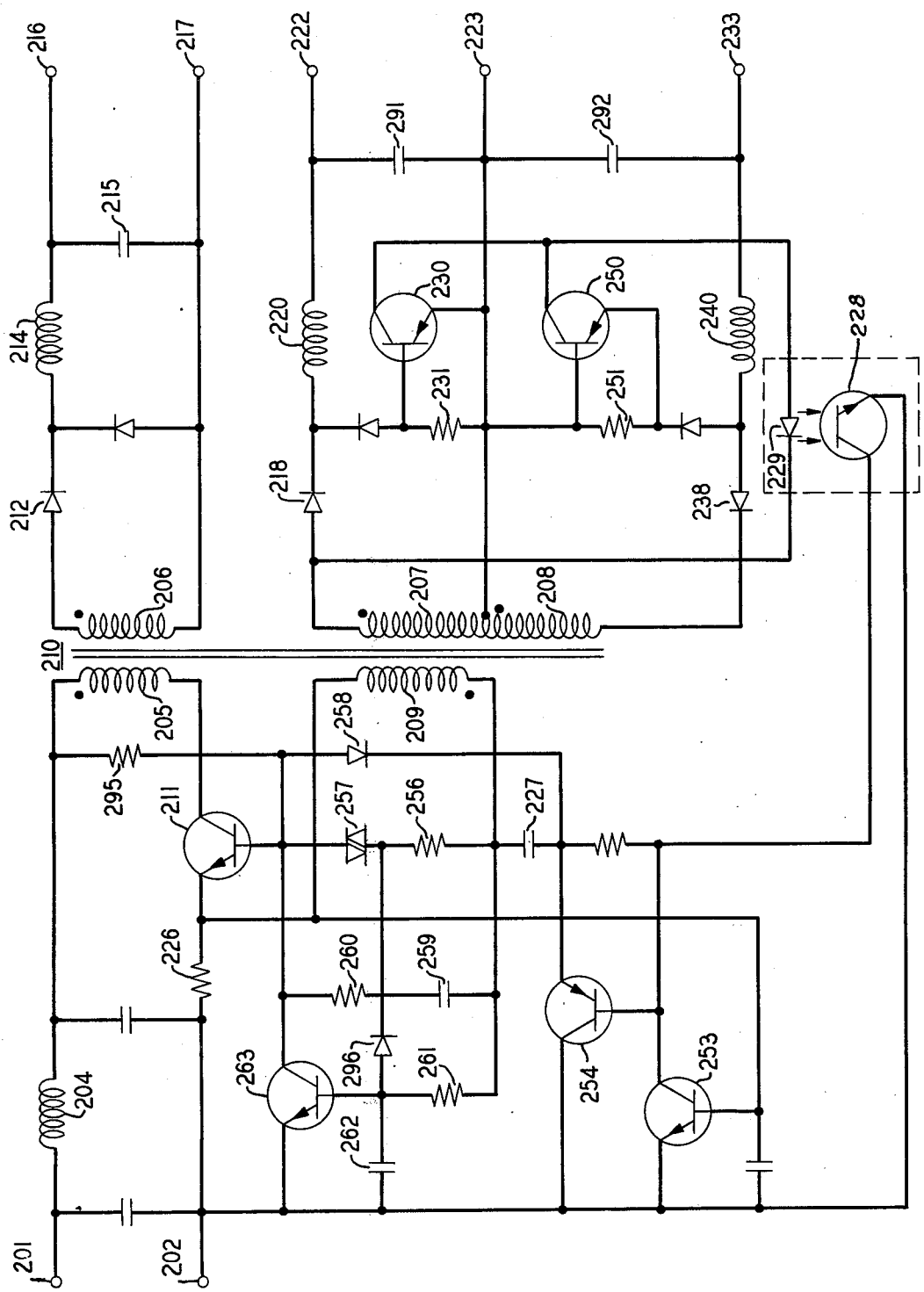
FIG. 2 discloses a single-ended converter embodying secondary current limiting in an output having tracking output terminals in accordance with the principles of the invention.

FIG. 2 is a detailed schematic of a single-ended converter having a primary winding, a feedback winding, and two secondary or output windings. One output winding supplies a single polarity output and the other output winding is center tapped to provide two oppositely poled output signals. A DC voltage is applied to the two input terminals 201 and 202. In response to this input voltage, power passes through the filter inductor 204 and primary winding 205 of the power transformer 210 to the switching transistor 211. The switching transistor 211 is periodically biased conducting to convert the DC voltage into a controlled square wave across primary winding 205. This square wave, applied to the primary winding 205, is transformed by transformer 210 to selected output signals in the output windings 206, 207, and 208.

The output signal of winding 206 is rectified by diode 212 and filtered by the inductor 214 and capacitor 215 to achieve a DC output voltage at terminals 216 and 217. The square wave outputs of windings 207 and 208 are respectively rectified by diodes 218 and 238 and respectively filtered by the filter comprising the respective inductor and capacitor filter 220 and 291, and 240 and 292 to achieve DC outputs of opposite polarity at terminals 222 and 233. These opposite polarity DC outputs are referenced to the common return terminal 223. This common return terminal 223 is joined to the common node of the two series connected secondary windings 207 and 208.

The feedback winding 209 is utilized to derive feedback signals to control the switching of the switching transistor 211. The included feedback circuitry determines the frequency of operation of the converter and duty cycle of the switching transistor. Oscillation is initially started in the converter by current flowing from the input terminal 201 through the starting resistor 295 to the base of the switching transistor 211. The varistor 257 is included to prevent the starting current from being shunted from the base into the regenerative feedback circuit. The switching transistor 211 turns on and applies a voltage to the primary winding 205 which is positive at the polarity dot. As described above, this induces pulse voltages in the output windings 206, 207, and 208. It also induces a pulse voltage in the feedback winding 209. This voltage is positive at the dot and is fed back via resistor 256 and varistor 257 to the base of the switching transistor 211. This feedback signal drives the switching transistor 211 into saturation. The capacitor 259 in response to this signal is charged up to the difference between the winding voltage and the base emitter junction voltage of the switching transistor 211. The resistor 260 is included in series therewith to limit current flow through the capacitor 259. This voltage of the feedback winding 209 also charges the capacitor 262 through the resistor 261. The voltage on the capacitor 262 charges to a level which eventually turns on the transistor 263. With the transistor 263 conducting, base drive current is shunted from the base of transistor 211 forcing it to turn off.

When the switching transistor 211 turns off the voltage of the windings 206, 207, 208, and 209 of the transformer 210, all reverse polarity. The reverse voltage across the feedback winding 209 combines with the existing charge voltage in the capacitor 259 to positively reverse bias the switching transistor 211, forcing it to rapidly turn off. The capacitor 259 now charges to a reverse voltage through the diode 296 and the core of the transformer 210 is reset for the next cycle of operation. As described above, current again flows through the starting resistor 295 and the above described cycle of operation is repeated.

Current limiting circuitry is included on the primary side of the converter to limit the peak primary current in the transformer primary winding 205. This peak primary current is directly proportional to the sum of the DC output currents of all the outputs. The primary current limit circuit operates to limit the total maximum aggregate of the output currents of all the outputs. The primary current being limited is sensed by the control circuitry through the current sensing resistor 226. Transistor 253 has its base emitter junction coupled across the current sensing resistor 226. The current sensing resistor 226 is selected so that its voltage drop at the maximum permissible current is sufficient to bias the transistor 253 conducting. With transistor 253 conducting, a collector current is applied to the base of transistor 254 which is biased conducting thereby. In response thereto current flows from the winding 209 through the capacitor 227 and charges the bottom plate positively. The amount of charge stored is determined by the conductivity duration of transistor 254. When the switching transistor 211 turns off in response to the action of transistor 263, the reverse voltage of winding 209 is applied through capacitor 227 to forward bias the diode 258. After the core has been reset, the diode 258 shunts starting current from the base of the switching transistor 211 preventing it from turning back on. The length of time that the turn on of the switching transistor 211 is delayed is determined by the amount of charge on capacitor 227. This determines by how much the duty cycle is reduced to keep the primary current within its permissible limits.

A secondary current limiting circuit is disclosed which operates in accordance with the invention to regulate the maximum current permitted at the oppositely poled output terminals 222 and 233. The current output at terminal 222 is sensed during the nonconducting period of the switching transistor 211 by sensing the flyback current of the filter inductor 220. This is accomplished by sensing the current flowing through the current sensing resistor 231. When the voltage across the current sensing resistor 231 exceeds the base-emitter turn on voltage of transistor 230, the transistor 230 turns on. In response to the reverse voltage across winding 207 applied to the circuit path including transistor 230, a current flows through the transistor 230 and the light emitting diode 229. The light output of the light emitting diode 229 operates the phototransistor 228 which in turn operates the primary current limit circuit as described below.

The negative output current at output terminal 233 is sensed in a similar manner by sensing the flyback current flowing through the current sensing resistor 251. The voltage across the current sensing resistor 251 turns on transistor 250 and permits current to flow in the light emitting diode 229. The phototransistor 228 responds to the light output of the light emitting diode 229. The phototransistor is connected across or in parallel with the transistor 253 in the primary current limit circuit and interacts with the primary limit circuit to reduce the duty cycle of the transistor 211 in the same manner as the conduction of transistor 253 operates to reduce the duty cycle.

Figure 3:
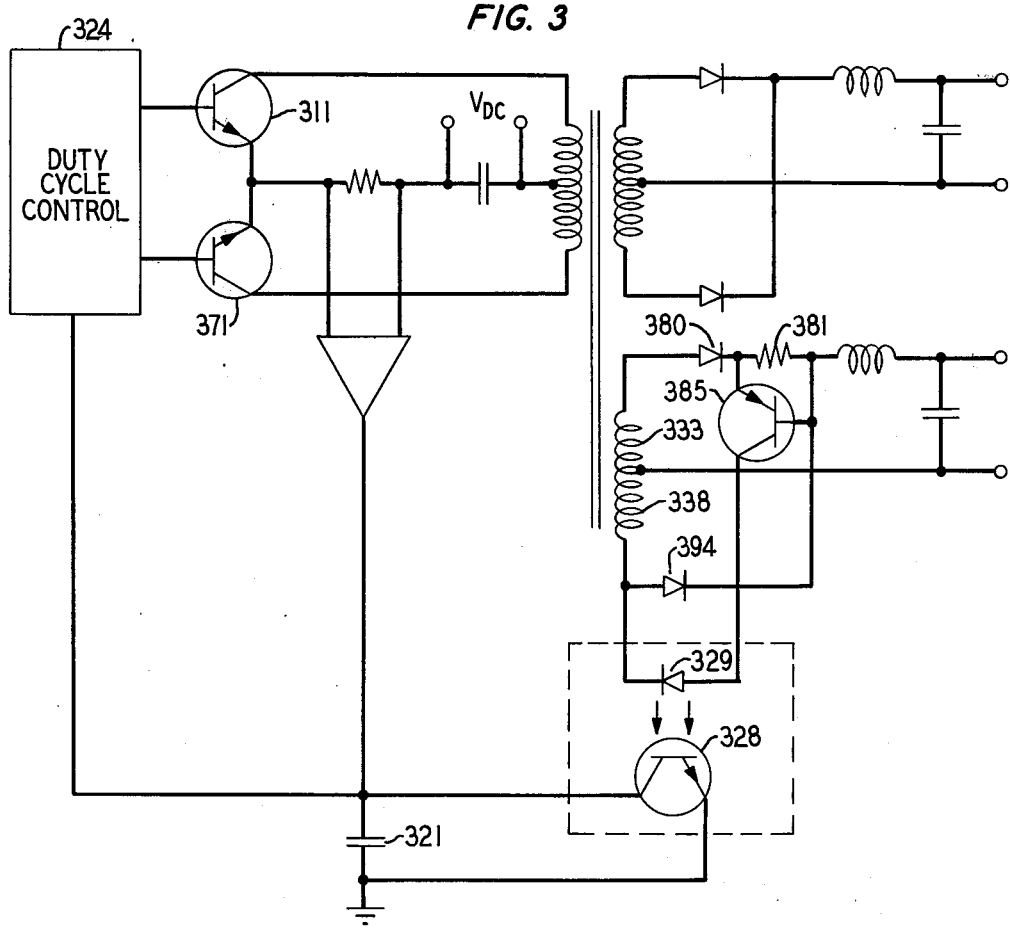
FIG. 3 discloses a double-ended converter having multiple outputs and secondary current limiting in accordance with the principles of the invention.

In FIG. 3 a secondary current limit circuit according to the principles of the invention is applied to a push-pull converter configuration. This secondary current limit circuit is similar to the above-described circuit applied to the single-ended converted circuit. It differs from the above mainly in that the output current being monitored is being sensed during one-half cycle of the on time of a switching transistor. The current is sensed to detect an overcurrent during the interval when the rectifying diode 380 is forward biased. The secondary winding 333 has a positive voltage which is applied to the anode of rectifying diode 380 inducing a current flow therethrough. This current flows through the current sensing resistor 381. When the current through resistor 381 exceeds a predetermined limit, the voltage drop thereacross biases the transistor 385 into conduction. The voltage across the winding 338 induces a current to flow in the collector-emitter of transistor 385 when the current in the current sensing resistor 381 is sufficient to bias it into conduction. The current flow through transistor 385 activates the light emitting diode 329 which in turn generates light signals to activate the phototransistor 328. The phototransistor 328 is coupled via capacitor 321 to the duty cycle control 324. It operates thereon to reduce the operative duty cycle of the switching transistors 371 and 311, and thereby limit the maximum permissible current flow through the resistor 381.

What is claimed is:

1. In a converter circuit
an input circuit including switching means and means to control the duty cycle of said switching means, said input circuit including current limit means operative through said means to control to limit maximum current in said input circuit by limiting a duty cycle,
at least a first and a second output circuit, said first output circuit including output current limit means operative through said means to control to limit maximum current in said first output circuit comprising means to monitor a current in said first output circuit, current threshold responsive means coupled to said means to monitor and responsive to a threshold of current in said first output circuit, a light emitting diode coupled to said threshold responsive means, said light emitting diode being energized in response thereto,
a phototransistor having a base optically coupled to and responsive to said light emitting diode, the output of said phototransistor being coupled to said means to control and being preferentially operative over said current limit means when energized to limit maximum current in said first output circuit by limiting a duty cycle.

2. A converter circuit as defined in claim 1 wherein said first output circuit includes a rectifier, a filter and a flyback current path,
said means to monitor comprises current sensing means in said flyback current path and said threshold responsive means comprises a semiconductor device having a control terminal coupled to said current sensing means and a main conductive path connected to said light emitting diode, and
a second current path including the main conductive path of said semiconductor device and said light emitting diode, said current path connected to said first output circuit so that current flow is energized to flow therein in response to a voltage extant in said output circuit.

3. A converter circuit as defined in claim 2 wherein said input circuit and said first output circuit are coupled by a transformer and said first output circuit is connected to a first secondary winding of said transformer, and said second current path is connected in shunt with said first secondary winding and the voltage thereacross induces a current flow in said light emitting diode when the main conductive path of said semiconductor device is enabled.

4. In a converter circuit including a power transformer,
a primary current limit circuit operating to limit current in a primary winding of said power transformer and including a peak current detector circuit having peak signal storage means,
at least a secondary winding of said transformer being coupled to an output circuit including a rectifying diode and a filter inductor, a flyback current path coupled to said filter inductor and including current sensing means, a second current path shunting said secondary winding and including a light emitting signaling device responsive to a current flow and a gating device, said gating device coupled to said current sensing means and responsive to a current threshold therein to enable said current path and a light responsive receiving device optically coupled to said signaling device and being connected to said peak signal storage means and operative to initiate current limiting in said converter circuit.

5. A converter circuit as defined in claim 4 further including a second secondary winding joined at a common node in series with said first secondary winding, a second rectifying diode, a second filter inductor and a second flyback current path,
a second current sensing means and a second gating device coupled to said second current sensing means and responsive to a current threshold therein, said second gating device having an output terminal connected to said current path at a junction of said first gating device and said light emitting signaling device whereby the response of said second gating device to a current threshold in said second current sensing device enables current flow in said current path thereby activating said light emitting signaling device.

6. A converter circuit comprising:
a transformer including a primary winding and a first and second secondary winding,
input means for accepting a voltage source,
switching means for coupling said input means to said primary winding,
pulse means for generating a bias signal pulse and coupled to drive said switching means,
current sensing means coupled for sensing a current conducted by said switching means,
said pulse means coupled to and responsive to said current sensing means for limiting the duty cycle of said bias signal pulse in response to an overcurrent,
wherein the improvement comprises:
a normally disabled current conduction path coupled to be energized by a voltage generated by said first secondary winding,
second current sensing means coupled for sensing an output current responsive to said first secondary winding, including
means for enabling conduction in said conduction path in response to an overcurrent, and
signaling means responsive to current flow in said conduction path, said signaling means coupled to said pulse means and having DC isolation characteristics to maintain DC isolation between said conduction path and said pulse means, whereby a signal output of said signaling means limits the duty cycle of said bias signal in response to an overcurrent responsive to said first secondary winding.

7. A converter circuit as defined in claim 6 wherein said normally disabled current conduction path is connected in shunt with said first secondary winding and said signaling means comprises a light emitting diode poled in a direction to be forward biased by voltage across said first secondary winding when current flows through said second current sensing means.

8. A converter circuit as defined in claim 7 wherein said signaling means further includes a phototransistor optically coupled to said light emitting diode, said phototransistor having an output terminal coupled to said pulse means and operative to limit the duty cycle of said bias signal pulse in response to an overcurrent responsive to said first secondary winding.

9. A converter circuit as defined in claim 6 wherein a diode rectifier and a filter inductor are connected in series and coupled to said first secondary winding, a flyback current path connected to said filter inductor, said second current sensing means comprising a resistor included in said flyback current path, and said means for enabling conduction comprises a transistor having a control junction connected in shunt with said resistor.

10. In a converter circuit including a power transformer, an input primary winding, a first secondary winding and at least a second secondary winding,
first current limiting means to limit maximum current in said primary winding including current sensing means coupled to said primary winding and threshold responsive means coupled to actuate said current sensing means,
an output circuit connected to said first secondary winding including a rectifying diode, a filter inductor and a flyback current path,
a second current limiting means to limit maximum current in said output circuit including means to monitor current flow in said flyback current path,
a signaling device and a gating device connected in series circuit, the series circuit shunting said first secondary winding, said gating device coupled to and being responsive to said means to monitor at a particular current threshold therein, and
a receiving device coupled to said signaling device through a DC isolated coupling, said receiving device connected in parallel with said threshold responsive means and operative to actuate said first current limiting means.

11. A converter circuit as defined in claim 10 wherein said signaling device comprises a light emitting diode, said receiving device comprises a phototransistor and said signaling device and said receiving device being optically coupled.

12. In a converter circuit:
a transformer including a primary winding and a secondary winding adapted to be coupled to a load to be energized,
input means for accepting a voltage source,
switching means for coupling said input means to said primary winding,
pulse means for generating a bias signal pulse and coupled to drive said switching means, said pulse means responsive to a control signal to control a duty cycle of said bias signal pulse,
a current conduction path coupled to be energized by an alternating voltage generated by at least a portion of said secondary winding,
said current conduction path including unidirectional means to limit current flow therein to a singular direction in response to a particular voltage polarity represented by a predetermined voltage polarity of the alternating voltage generated by said secondary winding,
current sensing means coupled for sensing an output current directly responsive to a periodic voltage of said secondary winding, including
gating means coupled to said current sensing means and operative for enabling conduction in said current conduction path in response to an output current exceeding a predetermined threshold, and
signaling means responsive to current flow in said current conduction path, said signaling means coupled to said pulse means and having DC isolation characteristics to maintain DC isolation between said current conduction path and said pulse means, whereby a signal output of said signaling means is operative as a control signal to limit a duty cycle of said bias signal pulse in response to an output current responsive to said secondary winding exceeding a predetermined threshold.

13. A converter circuit as defined in claim 12 wherein said signaling means comprises a light emitting diode poled in a direction to be forward biased by said predetermined voltage polarity generated by said secondary winding and energized when said output current exceeds said predetermined threshold.

14. A converter circuit as defined in claim 13 wherein said signaling means further includes a phototransistor optically coupled to said light emitting diode, said phototransistor having an output terminal coupled to said pulse means and operative to limit the duty cycle of said bias signal pulse in response to an output current exceeding a predetermined threshold.

15. A converter circuit as defined in claim 12 wherein a diode rectifier and a filter inductor are connected in series and coupled to said secondary winding, a flyback current path connected to said filter inductor, said current sensing means comprising a resistor included in said flyback current path, and said gating means operative for enabling conduction comprises a transistor having a control junction connected in shunt with said resistor.

16. A converter circuit comprising:
a transformer including a primary winding and a first and second secondary winding,
input means for accepting a voltage source,
switching means for coupling said input means to said primary winding,
current threshold sensing means coupled to sense a particular current threshold conducted by said switching means,
means for disabling conduction through said switching means responsive to said current threshold sensing means,
wherein the improvement comprises:
second current threshold sensing means coupled to sense a second current threshold of a current responsive to a voltage of said first secondary winding, said second current threshold sensing means including, a sensing impedance, a three electrode sense conductor device including a control electrode coupled to said sensing impedance and having a main conduction path, a signal transmission device having two input terminals connected to said main conduction path and to one terminal of said first secondary winding, respectively, said one terminal selected such that a voltage is generated during selected half cycle intervals when current is conducted by said sensing impedance to enable current flow through said main conduction path and said input terminals of said signal transmission device, said signal transmission device having DC isolated output terminals coupled to said means for disabling conduction.

* * * * *